Patented Mar. 22, 1927.

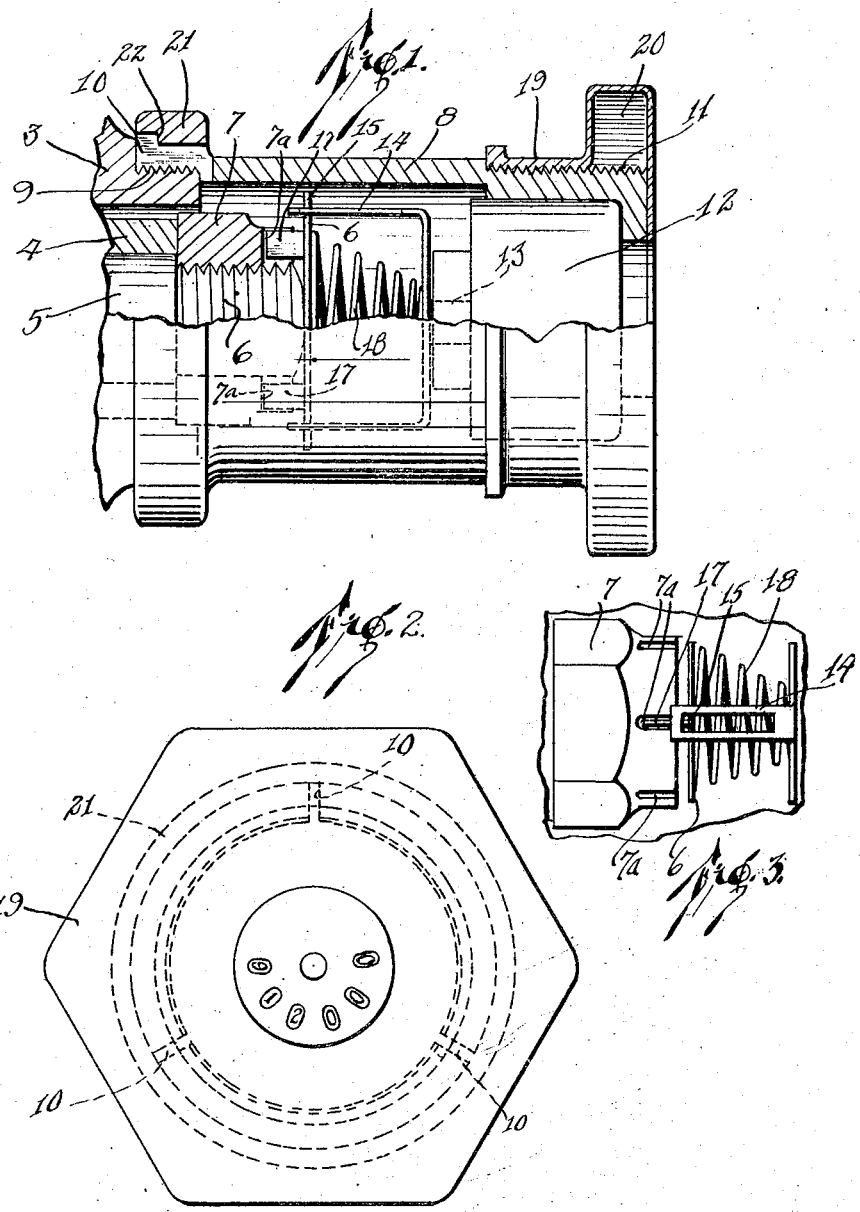

1,621,556

UNITED STATES PATENT OFFICE.

JACOB J. MITNICK AND JACKSON L. SILVERSTINE, OF CHICAGO, ILLINOIS.

HUB CAP.

Application filed January 9, 1926. Serial No. 80,260.

Our invention relates to improvements in hub odometers, and it consists in the combinations, constructions, and arrangements herein described and claimed.

In automobiles which are used for certain purposes, it has been found that odometers which are attached to the hubs of vehicles are greatly preferable to those that are placed on the instrument board. Thus, in automobiles which are rented to individuals who drive the cars themselves, it has been found that odometers used on the hubs more nearly indicate the actual mileage than those which are more accessible and which may be easily tampered with. There is in use a hub odometer in which the odometer is carried by the hub and revolves with it. A connection between the odometer and the relatively stationary axle causes the operation of the odometer instrument. Even these odometers, although preferable to the instrument-board type, which, of course are driven through mechanical connection with the wheels, as for instance by the links of a chain, have certain objections. In the ordinary form of hub odometer, the outer end is generally formed in the shape of a hub cap, but is integral with the hub. The hub casing is screwed to the wheel plate and has generally been secured thereto by means of screws. One objection to this type is that the outer portion, which simulates a cap, is apt to ride up on the curb, and this loosens the hub casing and tends to put the odometer out of commission. Another objection is that the hub casing can be removed and the odometer tampered with and then replaced so that it may be very difficult to determine just what the mileage is.

An object of our invention is to provide a hub odometer in which the engagement of the outer end with the curb will not injure the odometer, or put it out of commission.

A further object of our invention is to provide means for fastening the hub casing to the wheel plate so that there is no danger of tampering with the device, thereby insuring the correct reading of the odometer and the proper charge for the use of the car figured on a distance basis.

A further object of our invention is to provide a simple device of the type described, having a removable cap which can be made to match the ordinary hub caps instead of requiring a special type of end, and which, when removed, will permit the application of the fastening device, after which the cap can be again replaced to give to the hub odometer a finished appearance.

Other objects and advantages will appear in the following specification, and the novel features of the invention will be particularly pointed out in the appended claims.

Our invention is illustrated in the accompanying drawings, forming part of this application, in which—

Figure 1 is a side view of the device, certain portions being shown in section,

Figure 2 is an end view of the device, and

Figure 3 is a detail view showing a portion of the odometer connection.

In Figure 1, we have shown a portion of the wheel plate 3, the housing 4 for the shaft 5, and the threaded end 6 of the shaft. On this threaded end is a castle nut 7.

The hub casing 8, as will be observed, is screwed to the wheel plate, as shown at 9. The hub casing is slotted preferably at equidistant points, these slots being indicated at 10, see Figure 2, for a purpose hereinafter described.

The opposite end of the hub casing has a reduced threaded portion 11. The interior of this portion contains the odometer 12. We have merely shown the casing of this odometer. The odometer shaft, which is indicated in dotted lines at 13, has a guide yoke 14, the ends of which are slotted, as shown in Figure 3, to receive projections 15 of a plate 16 which has ears or lugs 17 arranged to enter in the slots 7ª of the castle nut 7. A spiral spring 18 keeps the lugs at all times within the slots 7ª. It will be understood that the casing 12 is firmly secured to the hub casing 8 to revolve with the casing, so that as the odometer casing revolves, while the end of the shaft and the nut 7 are relatively stationary, as far as revolution goes, the indicating mechanism will be actuated. The particular type of odometer and its particular connection to the shaft forms no feature of the present invention, having been used before. The particular features of novelty of the present invention lie in providing the outer end of the hub with the reduced threaded portion 11 to which a cap 19 is secured, this cap being so fashioned as to form a hollow interior 20 about the threaded portion 11.

The hub casing is fastened to the wheel plate, as stated, by screwing it thereto. The particular provision for securing it permanently in place, however, consists of a ring 21 having a shoulder 22 arranged to engage a shoulder on the hub casing so as to bring the ring 21 and the particular part of the hub casing on which it fits into alignment. This ring 21 is made slightly smaller than the hub portion on which it fits and it is driven on from the outer end. In so doing, it crowds the threaded sections between the slots 10 closer together and causes them to grip the threaded end of the wheel plate so that there is very little liability of anyone tampering with the device, since it is almost impossible for one to see how this connection is made.

It is of course necessary to take off the cap 19 in order to slip on the ring 21. After the ring has been forced into place to lock the hub casing on the wheel plate, the cap 20 is replaced, thereby giving the hub the ordinary finished appearance.

With hub odometers, as they are now made, the outer ends form part of the hub casing and are solid, and for different cars, different ends must be used. In the present instance, it is obvious that a cap of any suitable shape might be used in lieu of the hexagonal cap shown in Figure 2. All of these caps, however, have the space 20 between the cap and the end of the threaded portion 11. Now, when the car runs against the curb, the cap portion may be dented, but the hub casing will not come loose from its connection to the wheel plate, nor will the odometer be injured because of the fact that the cap is hollow and the giving of the hollow shell prevents injury to the odometer or the wrenching of the casing from its connection to the wheel plate. The fact that the cap is removable provides means for easily slipping on the locking ring 21, or for taking it off in case it should be desired to remove the hub casing from the wheel plate.

We claim:

1. The combination of a hub cap, means at one end for securing said hub cap to a wheel plate, and a relatively thin metal shell secured to the hub casing at the opposite end, a portion of said shell being spaced from the side walls of said casing.

2. The combination of a hub casing having a threaded outer end, and a cap arranged to be screwed to said threaded end, said cap consisting of a shell having a portion thereof spaced from the end of the outer side wall of said hub casing.

3. The combination of a hub casing having an interiorly threaded portion at one end arranged to be secured to a wheel plate, said threaded end being slotted, and a friction ring having an internal diameter slightly less than the external diameter of the slotted portion of the hub casing, and adapted to be driven onto the slotted portion of the hub casing, whereby the latter will be caused to grip the wheel plate.

4. The combination with a wheel plate having a threaded portion, of a hub casing, threaded at one end to engage the threaded portion of the wheel plate, said end being slotted, the opposite end of the hub casing having a reduced threaded portion, a friction ring adapted to slip over the reduced threaded portion and the exterior of the hub casing, said friction ring being of a slightly less diameter than the exterior portion of the slotted end of the hub casing, whereby the latter is contracted when the friction ring is driven onto the slotted end, and a cap removably secured to the reduced threaded end of the hub casing.

5. The combination with a wheel plate having a threaded portion, of a hub casing, threaded at one end to engage the threaded portion of the wheel plate, said end being slotted, the opposite end of the hub casing having a reduced threaded portion, a friction ring adapted to slip over the reduced threaded portion and the exterior of the hub casing, said friction ring being of a slightly less diameter than the exterior portion of the slotted end of the hub casing, whereby the latter is contracted when the friction ring is driven onto the slotted end, and a cap removably secured to the reduced threaded end of the hub casing, said cap having a portion spaced from the side wall of said reduced threaded portion.

JACOB J. MITNICK.
JACKSON L. SILVERSTINE.